No. 648,798.  
E. G. N. SALENIUS.  
METHOD OF TREATING MILK.  
(Application filed Sept. 23, 1899.)  
Patented May 1, 1900.
(No Model.)
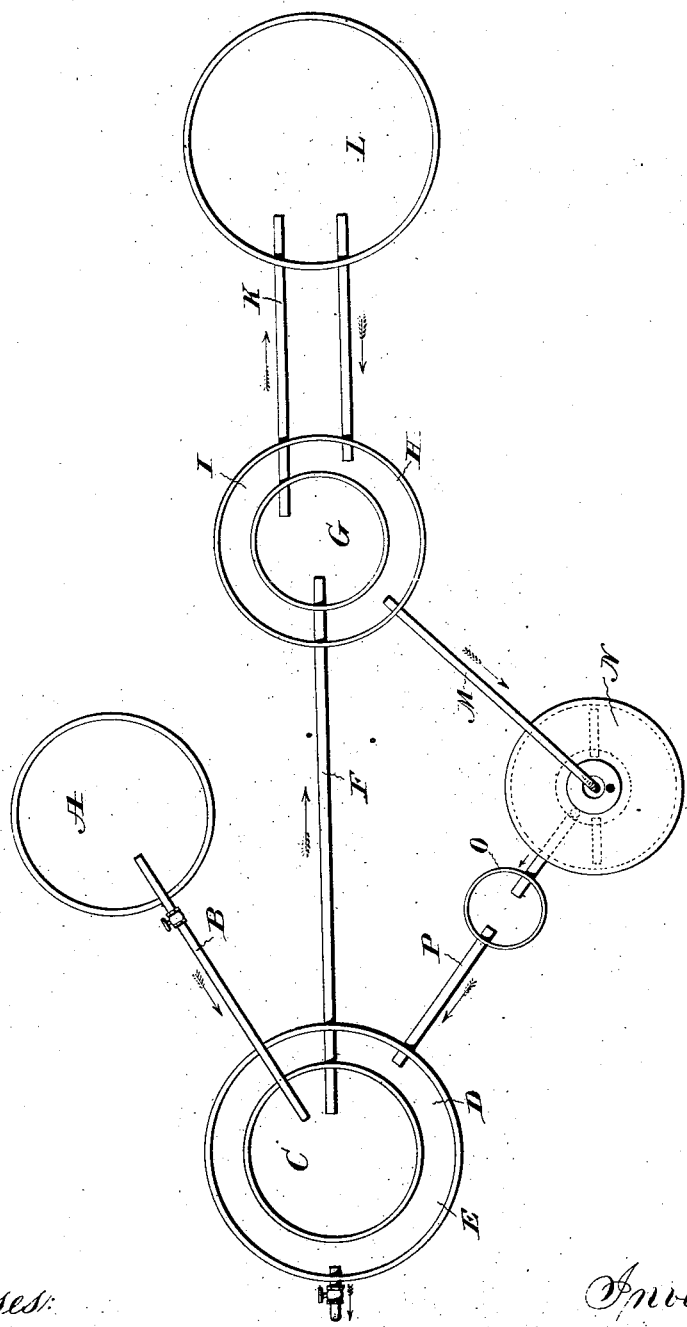
Witnesses:  
Jas. E. Hutchinson.  
C. J. Williamson,
Inventor.  
Erik G. N. Salenius, by  
Crindle and Russell, his Attys.

UNITED STATES PATENT OFFICE.

ERIK GUSTAF NICOLAUS SALENIUS, OF STORA-KRÄFTRIKET, SWEDEN.

METHOD OF TREATING MILK.

SPECIFICATION forming part of Letters Patent No. 648,798, dated May 1, 1900.

Application filed September 23, 1899. Serial No. 731,472. (No specimens.)

*To all whom it may concern:*

Be it known that I, ERIK GUSTAF NICOLAUS SALENIUS, engineer, a subject of the King of Sweden and Norway, and a resident of Stora-Kräftriket, Albano, in the Kingdom of Sweden, have invented certain new and useful Improvements in Methods of Treating Milk, (for which I have filed application for patent in Sweden the 23d day of January, 1899,) of which the following is a specification, reference being had therein to the accompanying drawing.

The object of my invention is to effect the heating of milk, as for pasteurizing or sterilizing, and the separation of the milk into its constituent parts as one continuous series of operations and to use the milk being treated partially or wholly as the heating and cooling agent; and my invention consists in the process of treating milk hereinafter described and claimed.

In carrying out my process I convey from a source A by a pipe B the cold milk which is to be treated to one chamber or coil of pipe C of a vessel D, which has another chamber E, that is occupied by warm milk, the treatment of which is in the last stage. In this vessel the warm milk which is about to leave the apparatus is cooled by the cold milk, the treatment of which is just commencing. The warmed milk is now conveyed by a pipe F to a chamber or coil G of a second vessel H, which vessel H, like the first one, D, has a chamber or coil I, that is traversed by the hot milk returning from its treatment in the heating apparatus L. The entering milk is here still further heated, and the returning milk here receives its first cooling. The milk to be treated now passes through a pipe K to the heating apparatus L, after which operation it passes to another chamber or coil of the second vessel H. The milk which has been heated reaches in the second vessel H that temperature at which the separation into its constituent parts can be most perfectly effected, and it is on leaving this vessel conveyed by a pipe M to the churn, centrifugal creamer, or other separating apparatus N. From the separating apparatus N the skim-milk passes to the receiving vessel O of the separating apparatus, and from thence it passes by a pipe P to its proper chamber or coil E of the first vessel, where it is reduced by the incoming milk to the desired temperature for preservation.

It will be seen that by my process the incoming milk is gradually heated, so as to require the application of but a limited amount of heat in the heating apparatus and that the heat imparted before reaching said apparatus is derived from the outgoing milk, thus effecting an economy in the heat necessary to be furnished in the treatment of the milk. It will also be seen that by my process the outgoing milk is gradually cooled and that this cooling is done by the incoming milk, so as to obviate the necessity of using the usual amount of cold water or ice to reduce its temperature to a safe point for preservation.

A most important advantage of my method is the interposition of the step of separating the milk into its constituents at the point where the outgoing milk, cooled by the incoming milk, has reached that particular temperature best suited for the separation operation. The milk is thus saved from a second heating to the desired temperature, and its delicately-constituted substance is thus saved the injury which results from repeated changes of temperature.

As the elements of my apparatus are of well-known construction, they have not been shown in detail.

Having thus described my invention, what I claim is—

The method of treating milk which consists in forming an incoming stream of cold milk, heating the milk, conducting the heated milk along the incoming stream of milk so that the incoming stream is heated while the outgoing stream is cooled to the proper temperature for separation into its constituent parts, separating the milk into its constituent parts, while it is at such temperature, and, finally, conducting the parts of separated milk along the incoming stream of milk so that they are cooled and their heat is imparted to said incoming stream of milk, substantially as and for the purpose described.

In witness whereof I have hereunto signed my name in the presence of two subscribing witnesses.

ERIK GUSTAF NICOLAUS SALENIUS.

Witnesses:
 A. F. LUNDBORG,
 J. F. A. RUTBACLY.